US010630675B2

(12) United States Patent
Ferrydiansyah et al.

(10) Patent No.: US 10,630,675 B2
(45) Date of Patent: Apr. 21, 2020

(54) GENERATING WEB SERVICE PICTURE PASSWORDS WITH USER-SPECIFIC CYPHER KEYS

(71) Applicant: Microsoft Technology Licensing, LLC, Redmond, WA (US)

(72) Inventors: Reza Ferrydiansyah, Redmond, WA (US); Vijay A. Halepet, Redmond, WA (US); Mythili Muruganathan, Redmond, WA (US); Mostafa Mostafa, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 15/099,380

(22) Filed: Apr. 14, 2016

(65) Prior Publication Data

US 2017/0302648 A1 Oct. 19, 2017

(51) Int. Cl.
*G06F 21/00* (2013.01)
*G06F 17/20* (2006.01)
*H04L 29/06* (2006.01)
*G06F 21/46* (2013.01)
*G06F 21/36* (2013.01)
*G06F 3/0488* (2013.01)
*G06F 17/40* (2006.01)

(52) U.S. Cl.
CPC ........ *H04L 63/083* (2013.01); *G06F 3/04886* (2013.01); *G06F 21/36* (2013.01); *G06F 21/46* (2013.01); *H04L 63/20* (2013.01); *H04L 63/06* (2013.01)

(58) Field of Classification Search
CPC .............................. H04L 63/083; H04L 63/20

USPC .......................................................... 713/184
See application file for complete search history.

(56) References Cited

U.S. PATENT DOCUMENTS

| | | | |
|---|---|---|---|
| 8,520,848 B1* | 8/2013 | Liu ........................ | H04L 63/083 380/52 |
| 2002/0088853 A1* | 7/2002 | Itoh ....................... | G06Q 20/045 235/382 |
| 2003/0074566 A1* | 4/2003 | Hypponen .............. | G06F 21/31 713/183 |

(Continued)

OTHER PUBLICATIONS

Aparna, et al., "A Method for Graphical Passwords Using Captcha", In International Journal of research, vol. 4, Issue 2, Jul. 2015, pp. 126-130.

(Continued)

*Primary Examiner* — Haresh N Patel
(74) *Attorney, Agent, or Firm* — Fiala & Weaver P.L.L.C.

(57) ABSTRACT

A picture password interface is displayed to generate a password for a web service that accepts text passwords to help users more easily remember their passwords. In response to receiving user input at a picture displayed in the picture password interface, values from an associated cipher key are identified. These identified values are then combined into a user key based on an order and location at which the user input was received. The user key is then combined with a web service key to generate a password that is specific to the user and specific to the web service that the user is attempting to access. The generated password can be verified to ensure that it complies with any password complexity rules for the web service.

20 Claims, 10 Drawing Sheets

(56) References Cited

U.S. PATENT DOCUMENTS

| | | | |
|---|---|---|---|
| 2003/0223580 A1* | 12/2003 | Snell | H04L 9/003 380/28 |
| 2006/0206717 A1 | 9/2006 | Holt et al. | |
| 2010/0251339 A1* | 9/2010 | McAlister | G06F 21/604 726/4 |
| 2010/0287382 A1 | 11/2010 | Gyorffy et al. | |
| 2010/0328218 A1* | 12/2010 | Sip | G06F 3/0233 345/168 |
| 2010/0332841 A1 | 12/2010 | Watts et al. | |
| 2011/0213985 A1* | 9/2011 | Miller | G06F 21/35 713/185 |
| 2012/0011564 A1 | 1/2012 | Osborn et al. | |
| 2012/0060033 A1 | 3/2012 | Giuliani et al. | |
| 2012/0128258 A1* | 5/2012 | Wang | G06F 21/36 382/218 |
| 2013/0097697 A1* | 4/2013 | Zhu | G06F 21/31 726/18 |
| 2014/0068754 A1* | 3/2014 | Burkill | G06F 21/36 726/18 |
| 2014/0283007 A1* | 9/2014 | Lynch | G06F 21/316 726/17 |
| 2015/0095646 A1* | 4/2015 | Nair | H04L 63/0428 713/168 |
| 2015/0135291 A1 | 5/2015 | Yang et al. | |
| 2015/0135335 A1* | 5/2015 | Garimella | G06F 21/34 726/28 |
| 2015/0207788 A1* | 7/2015 | Chiou | H04L 63/083 726/6 |
| 2015/0220718 A1* | 8/2015 | Hong | H04L 63/0807 726/9 |
| 2015/0249658 A1* | 9/2015 | Lee | H04L 63/083 726/6 |
| 2016/0050198 A1* | 2/2016 | Thibadeau, Sr. | H04L 63/0807 726/6 |
| 2016/0055698 A1* | 2/2016 | Gudmundsson | G07C 9/00142 340/5.52 |
| 2016/0253488 A1* | 9/2016 | Zheng | G06F 21/31 726/19 |
| 2017/0171185 A1* | 6/2017 | Camenisch | H04L 63/083 726/1 |
| 2017/0302648 A1* | 10/2017 | Ferrydiansyah | H04L 63/20 726/1 |

OTHER PUBLICATIONS

"International Search Report and Written Opinion", Application No. PCT/US2017/026371, dated Aug. 3, 2017, 11 pages.

Bicakci,"Graphical Passwords as Browser Extension: Implementation and Usability Study", Jan. 1, 2009, 15 pages.

Horsch,"PALPAS PAsswordLess PAssword Synchronization", Aug. 24, 2015, 10 pages.

Jansen,"Picture Password: A Visual Login Technique for Mobile Devices", Jul. 3, 2003, 20 pages.

* cited by examiner

GENERATING WEB SERVICE PICTURE PASSWORDS WITH USER-SPECIFIC CYPHER KEYS

BACKGROUND

As computing technology has advanced, text passwords are frequently used to access web services such as web sites, web domains, associated applications, and Internet services. For security concerns, text passwords are often constrained by complexity rules such as a minimum number of characters, a minimum number of special characters, a minimum number of numbers, and a wide range of other constraints. Users are recommended to have different text passwords for different services, which requires memorization of many complex passwords. However, because of the complexity of these passwords, users often reuse a single password to avoid memorizing complex and unintuitive text passwords. Password reuse increases the risk of unauthorized use of the user's web services in the event that the security of any single service is compromised. Although there are password managers that create and store text passwords for some web services, any unauthorized access to the password manager compromises the security of all passwords stored by the password manager. As such, web service text passwords are easily compromised.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a picture is displayed as part of a picture password interface. User input selecting at least one of multiple different regions of the displayed picture is received, each of the multiple regions corresponding to a different one of multiple cells of a cipher key corresponding to the displayed picture, each of the multiple cells corresponding to a string of one or more characters. A user key is generated by combining the strings of one or more characters of the cells corresponding to the selected at least one region. A password for a web service is generated by combining the user key with a web service key for the web service, and the generated password is communicated to the web service.

In accordance with one or more aspects, a user account corresponding to a user identifier is created. A picture associated with the user account is obtained, and a cipher key for the obtained picture is generated, the cipher key comprising multiple cells, individual ones of the multiple cells including a string of characters. The generated cipher key is associated with the obtained picture by correlating different regions of the obtained picture with different cells of the cipher key, and the obtained picture and associated cipher key are maintained as picture password data for the user account.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
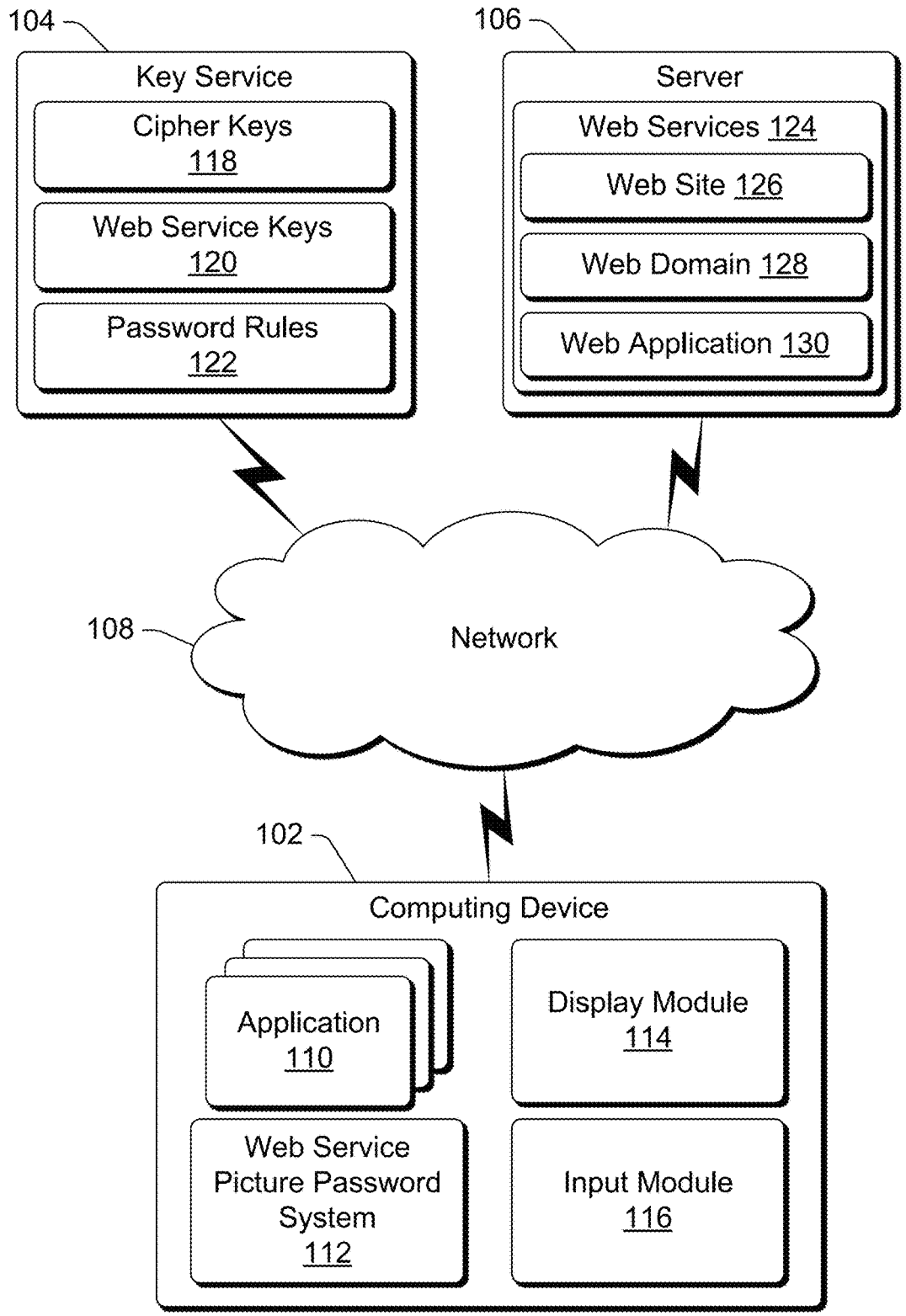
FIG. 1 illustrates an example operating environment in which the techniques described herein can be employed in accordance with one or more embodiments.

Picture password techniques are discussed herein. In order to protect web services from unauthorized access through brute force entries or random guessing, password complexity rules are often enforced by the web services. Although the introduction of password complexity rules enhances the security associated with access to web services, the creation and memorization of unique text passwords for different web services remains a difficult and tedious process. In order to mitigate the difficulty associated with memorizing these unintuitive and complex text passwords, users can interact with picture password interfaces in accordance with the techniques discussed herein to generate user-specific and web service-specific text passwords. Such a user-specific and web service-specific text password generated using the techniques discussed herein is also referred to as a picture password. As discussed herein, a picture password interface refers to a displayed picture and an associated hidden cipher key (the cipher key is referred to as hidden because it need not be, and typically is not, displayed). As discussed herein, a user-specific and web service-specific text password is for a combination of a particular user and a particular web service, and is in compliance with the web service's password complexity rules.

Picture password interfaces are used to generate text passwords that are user-specific and web-service specific. A picture that is used for the picture password interface may be selected by a user. Enabling a user to select the picture for a picture password interface allows the user to customize a picture password interface and more easily remember an input sequence used to generate the user-specific and web-service specific text password. A cipher key is generated and associated with the selected picture. The cipher key is a matrix that includes multiple cells, each cell including a string of characters. The cipher key is associated with the picture such that any user input received at the picture (e.g., touching of different regions of the picture, swiping among different regions of the picture, etc.) can be correlated with a cell of the cipher key. The size of the cipher key can vary based on a desired level of security for the picture password. For example, a cipher key including a large number of cells can be used to generate a more secure picture password than a cipher key including a small number of cells.

User input is received corresponding to various regions of the picture. Based on the received user input, values from the cipher key are identified and combined to generate a user key. This user key is then combined with a web service key to generate a text password that is specific to both the user and the web service. In this manner, picture password interfaces can be used to generate text passwords for web services that only support traditional text passwords.

In order to comply with password rules for a web service, characters of a text password generated from user input at the picture password interface are compared against password rules for the web service. Individual characters of a generated password are then changed until the generated password complies with complexity rules for a particular web service. Pictures, associated cipher keys, web service keys, and password rules can be stored as picture password data at a key service. This key service offers additional security over traditional password managers. Even if a hacker gains unauthorized access to the key service, the correct sequence of user input required to generate the text password remains known only to the user.

The picture password techniques described herein enable users of web services that only support text passwords to create picture password interfaces that are more easily remembered. For example, while a user previously needed to remember a random string of characters as a password, the techniques herein only require a user to remember an input sequence for a given picture. This enhances the security of the web services by allowing users to readily and easily generate, use, and remember complex passwords. The techniques described herein also eliminate the need for the user to adjust their password to comply with complex web service password rules.

The techniques described herein further provide picture password functionality to a web service without requiring changes to the underlying password system of the web service. For example, while switching to more secure user authentication techniques, such as biometrics or picture passwords, requires changing an underlying password system of the web service, the techniques described herein provide a picture password interface for outputting a text password to a web service. Thus, the techniques described herein can be easily adopted by existing web services and make password memorization substantially easier for a user.

FIG. 1 illustrates an operating environment 100 in which the techniques described herein can be employed in accordance with one or more embodiments. Operating environment 100 includes a computing device 102 that can communicate with a key service 104 and one or more servers 106 via a network 108. Network 108 can be a variety of different networks, including the Internet, a local area network (LAN), a public telephone network, an intranet, other public and/or proprietary networks, combinations thereof, and so forth.

Computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch, headset, augmented reality headset or glasses, virtual reality headset or glasses), an entertainment device (e.g., an entertainment appliance, a set-top box communicatively coupled to a display device, a game console), a television or other display device, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Key service 104 can be implemented by one or more of a variety of different types of computing devices capable of storing data that can be accessed and retrieved by a web service picture password system 112 of computing device 102. For example, web service picture password system 112 may access and retrieve picture password data from key service 104 via network 108 as illustrated in FIG. 1. Additionally or alternatively, key service 104 may be configured as a portable hardware device, such as a Universal Serial Bus (USB) drive. In such a portable hardware device configuration, key service 104 may be communicatively coupled (wirelessly or wired) to computing device 102 so that web service picture password system 112 can access key service 104 independent of a network 108. Similar to the discussion of computing device 102, key service 104 can be implemented using a variety of different devices, ranging from full resource devices with substantial memory and processor resources to low-resource devices with limited memory and/or processing resources. Picture password data stored at key service 104 includes cipher keys 118, web service keys 120, and password rules 112.

Server 106 can be a variety of different computing devices capable of hosting web services 124 that can be accessed by the web service picture password system 112 of computing device 102. Similar to the discussion of computing device 102, server 106 can be a variety of different devices, ranging from full resource devices with substantial memory and processor resources to low-resource devices with limited memory and/or processing resources. Examples of web services 124 stored at server 106 include web sites 126, web domains 128, and web applications 130. Although a single server 106 is illustrated in FIG. 1, it should be noted that multiple servers 106 can be included in the operating environment 100, and that such multiple servers 106 can host or otherwise provide the same and/or different web services 124.

Computing device 102 includes one or more applications 110, web service picture password system 112, display module 114, and input module 116. Although web service picture password system 112 is illustrated as implemented independent of applications 110 (e.g., as part of an operating system of computing device 102), alternatively the web service picture password system 112 can be implemented as part of one or more of applications 110. For example, functionalities of the web service picture password system 112 can be implemented as a plug-in to an application 110, such as a web browser application. It is to be appreciated and understood that the techniques described herein can be employed in the context of applications other than web browser applications. Such other applications can include, for example, word processing applications, spreadsheet applications, email applications, visual presentation applications, and the like.

Web service picture password system 112 provides picture password functionality for one or more web services 124 in accordance with the techniques described herein. Web service picture password system 112 can register users with key service 104 and obtain picture password interfaces for web services 124. Based on received user input to a picture password interface, web service password system 112 can generate a text password for the web service and verify that the generated password complies with web service password rules. In this manner, web service picture password system 112 provides picture password functionality to web services that otherwise utilize only text passwords.

When a user of computing device 102 requests access to one or more of web services 124, web service picture password system 112 retrieves data stored at key service 104. For example, web service picture password system 112 can retrieve one or more cipher keys 118 based on an identification of a user attempting to access a web service. Cipher keys 118 and associated pictures are discussed in further detail below. Web service picture password system 112 may also retrieve a web service key 120 that is associated with the web service 124 being accessed. Alternatively, if no web service key exists for the web service being accessed, web service picture password system 112 may generate a web service key 120 for the web service 124. A key for the web service can be generated using any of a variety of different rules or algorithms, such as randomly, pseudo-randomly, and so forth. If the web service 124 has any associated password complexity rules, web service picture password system 112 may also retrieve these password rules 122. Although web service keys 120 and password rules 122 are illustrated as being retrieved from key service 104, web service picture password system 112 may retrieve web service keys 120 and password rules 122 from a variety of sources, such as from computing device 102 or from a web service 124.

After data associated with accessing a web service 124 is retrieved from key service 104, web service picture password system 112 displays a picture in a picture password interface for the user to access the web service 124. The picture may be displayed via display module 114. User input is then received at the displayed picture via in input module 116 of computing device 102. Based on the received user input, retrieved cipher key 118, retrieved web service key 120, and any associated password rules 122, the web service picture password system 112 generates a text password to authenticate the user to the web service 124. This generated text password can then be output to the web service 124.

Display module 114 generates, manages, and/or outputs content for display, playback, and/or other presentation. This content can be created by display module 114 or obtained from other modules of computing device 102. This content can be, for example, a display or playback portion of a user interface (UI). The content can be displayed or otherwise played back by components of computing device 102 (e.g., speakers, interactive display devices, etc.). Alternatively, display module 114 can generate one or more signals that are output to other devices or components (e.g., speakers, display devices, etc.) that are separate from computing device 102.

Input module 116 receives user inputs from a user of computing device 102. User inputs can be provided in a variety of different manners, such as by pressing one or more keys of a keypad or keyboard of device 102, pressing one or more keys of a controller (e.g., remote control device, mouse, trackpad, etc.) of device 102, pressing a particular portion of a touchpad or touchscreen of device 102, making a particular gesture on a touchpad or touchscreen of device 102, and/or making a particular gesture on a controller (e.g., remote control device, mouse, trackpad, etc.) of device 102. User inputs can also be provided via other physical feedback input to device 102, such as tapping any portion of device 102, swiping among different portions of device 102, an action that can be recognized by a motion detection component of device 102 (such as shaking device 102, rotating device 102, etc.), and so forth. User inputs can also be provided in other manners, such as via audible inputs to a microphone, via motions of hands or other body parts observed by an image capture device, and so forth.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 2:
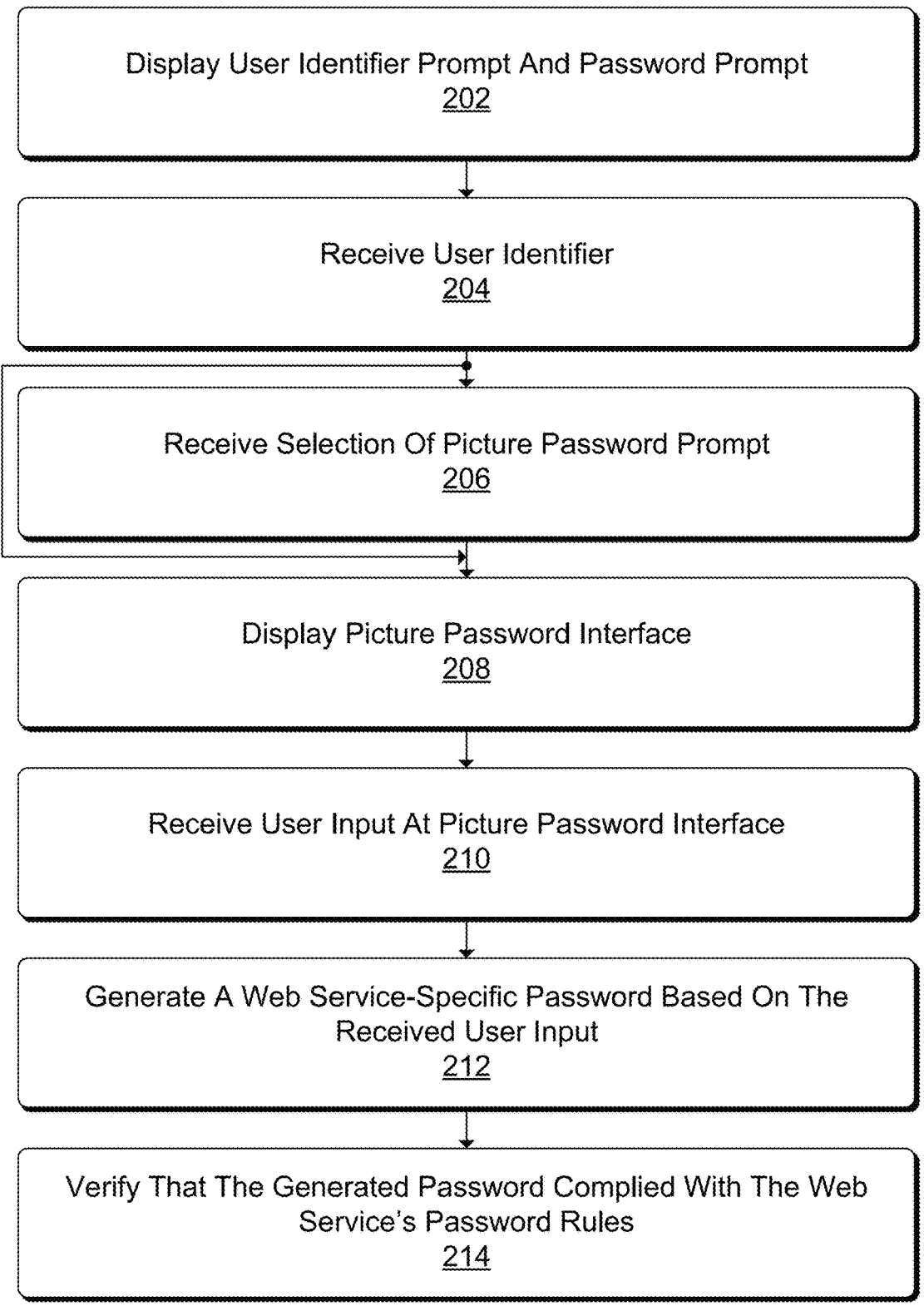
FIG. 2 is a flowchart illustrating an example process for generating a user-specific and web service-specific password from a picture password interface in accordance with one or more embodiments.

FIG. 2 is a flowchart illustrating an example process 200 for generating a user-specific and web service-specific password from a picture password interface in accordance with one or more embodiments. Process 200 can be implemented in software, firmware, hardware, or combinations thereof. For example, process 200 can be implemented by the web service picture password system 112 illustrated in FIG. 1. Process 200 is shown as a set of acts and is not limited to the order shown for performing the operations of various acts. Process 200 is an example process for generating a user-specific and web service-specific password from a picture password interface; additional discussions of generating user-specific and web service-specific passwords are included herein with reference to different figures.

In process 200, a user identifier prompt and a password prompt are displayed (act 202) in a user interface. The user identifier and the password to be entered in the respective prompts correspond to user account information for a web service. The user identifier specifies the identity of an individual user and may be a username, an e-mail address, a user identification number, and so on. The user interface may be provided by a web service and displayed as part of the web service's user interface. Alternatively, the user interface may be displayed by the system implementing process 200 as visually discernible from a user interface for the web service. For example, displaying the user interface as visually discernable from the web service's user interface may include displaying the user interface in a pop-up window separate from a window including the web service's user interface.

The user identifier entered by the user attempting to access a web-service is received (act 204). For users that have previously accessed the web service, the user identifier may correspond to an established account with the web service. Alternatively, for users that do not have an established account with the web service, the user identifier may indicate that the user wishes to open a new account with the web service.

After the user identifier is received, the system implementing process 200 may optionally display a picture password prompt. A selection of the picture password prompt is then optionally received (act 206). The picture password prompt may be displayed for one or more web services that natively support text passwords and do not natively support picture password functionality. For example, web services that only support text passwords (e.g., a subset of ASCII characters, such as letters, numbers, and particular symbols such as an asterisk, ampersand, exclamation mark, and so forth) may only provide a field for a user to enter a text password. For web services that do not natively support picture passwords, the picture password prompt may visually indicate to a user that the picture password may be created for the web service in place of the traditional text password.

In response to receiving the user identifier and optionally selection of the picture password prompt, a picture password interface is displayed (act 208). It should be noted that act 206 is optional, as an indication or selection to use a picture password may be assumed by default, may have been previously configured by the user, and so forth. The picture password interface may be displayed as part of the web service's user interface. Alternatively, the picture password interface may be displayed by the system implementing process 200 as being visually discernable from the web service's user interface. The picture password interface is discussed in more detail below with respect to FIG. 3.

User input is then received at the picture password interface (act 210) to generate a user key for the user. As discussed in more detail below, the picture password interface allows a user to select a picture and sequence of user input that are specific to the individual user and thus more easily remembered by the user. The picture password interface also allows the user to enter inputs at pictures that will be generated into text passwords for specific web services.

Based on the user input received at the picture password interface, a user-specific and web service-specific text password is generated (act 212). The system implementing process 200 takes into account not only the received user input, but also takes into account the web service for which the picture password interface is created. In this manner, text passwords generated by the system implementing process 200 are both the user-specific and web service-specific.

The generated text password is then optionally processed to verify that the generated password complies with any password rules for the web service (act 214). Password rules for a web service may include constraints such as minimum password length, minimum number of special characters, minimum amount of numbers, and so on. This verification ensures that any password generated by process 200 will comply with the web service's password rules and will thus be accepted by the web service.

Figure 3:
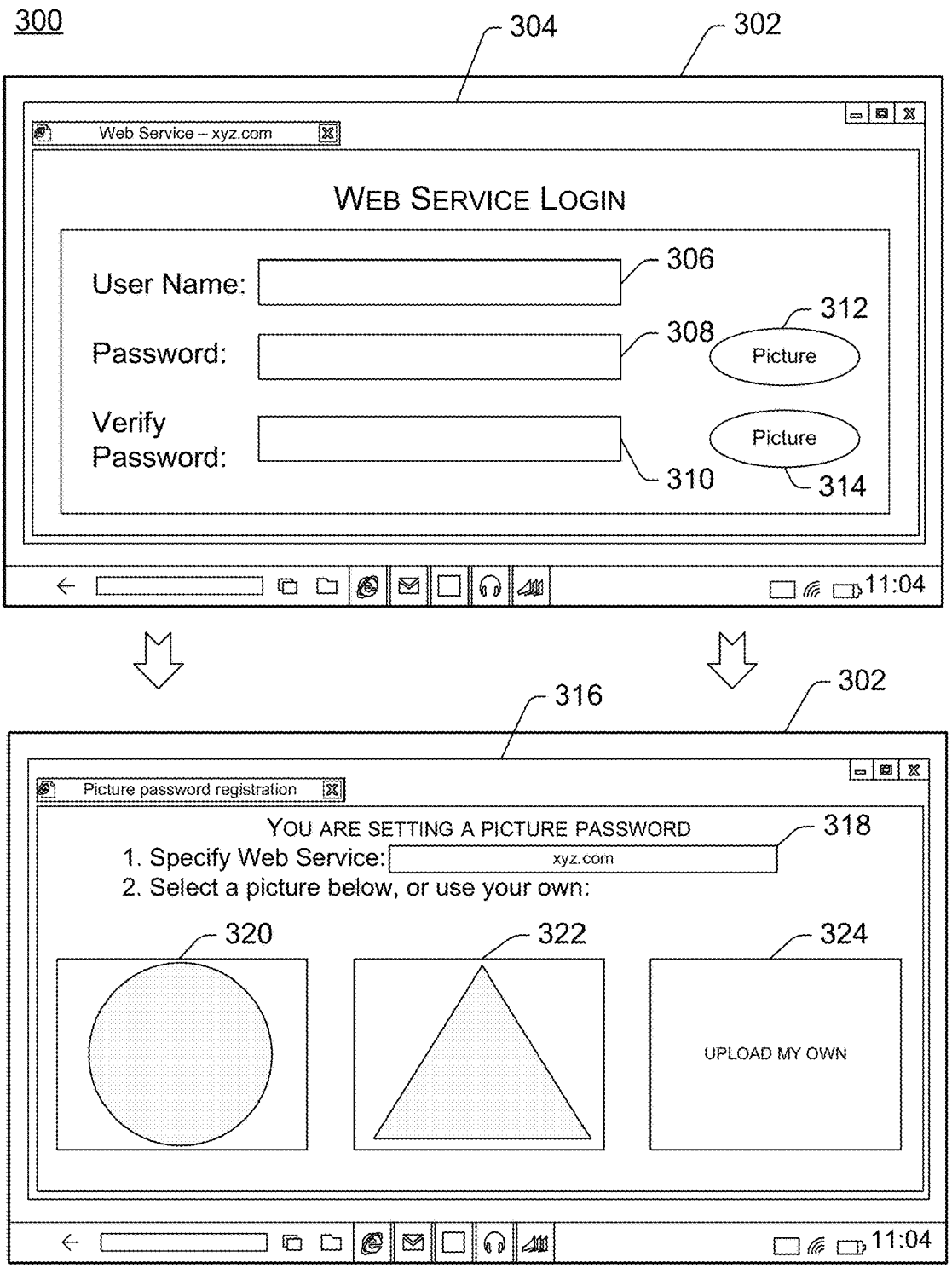
FIG. 3 illustrates an example of a picture password login interface in accordance with one or more embodiments.

FIG. 3 illustrates an example 300 of displaying a picture password login interface 302 in accordance with one or more embodiments. Picture password login interface 302 may be displayed by web service picture password system 112 in a variety of different configurations. For example, in one or more embodiments picture password login interface 302 may be displayed as a web service login interface configuration 304. In a web service login interface configuration 304, picture password login interface 302 includes various prompts for user information. The user information is authenticated before granting the user access to the web service. For example, user name prompt 306, password prompt 308, and verify password prompt 310 are fields designated to receive user credentials associated with accessing the web service. In the web service login interface configuration, picture password login interface 302 may resemble the appearance of a traditional login interface for web services that support text passwords. Accordingly, picture password login interface 302 may be configured to resemble an appearance of a web service's existing login interface.

Picture password login interface 302 additionally includes picture prompts 312 and 314. Picture prompt 312 corresponds to password prompt 308 and picture prompt 314 corresponds to verify password prompt 310. As illustrated, password prompt 308 and verify password prompt 310 are configured to each receive a text password. As referred to herein, a text password includes at least one character, such as an ASCII (American Standard Code for Information Interchange) character. In order to log in to the web service using conventional text passwords, a user would enter their user identifier in user name prompt 306 and would enter their password in both password prompt 308 and verify password prompt 310.

Picture prompts 312 and 314 provide the user with an alternative to entering text passwords. For example, in response to receiving selection of picture prompt 312, picture password login interface 302 may transition to display a picture password creation interface 316. Picture password creation interface 316 displays a visual indication to a user that the user is setting a picture password for a web service. A web service identifier 318 is displayed for the user to confirm that the picture password will be generated for the specified web service. In the illustrated example, the user is setting a picture password for a web site "xyz.com". The web service identifier 318 may be automatically populated by a web service picture password system 112. Alternatively, web service identifier 318 may be populated by receiving user input. For example, a user many manually enter a web service identifier 318 for a web service. This allows the user to customize a picture password for a specific web service.

The illustrated picture password creation interface 316 assumes that a user identifier was previously entered in user name prompt 306. Accordingly, web service picture password system 112 is made aware of both a specified web service as well as an identity of the user via web service identifier 318 and user name prompt 306. Alternatively, if a selection of either picture prompts 312 or 314 is received prior to receiving a user identifier, username prompt 306 may also be displayed in picture password creation interface 316.

After the user identifier is received and the web service is specified, a plurality of pictures are displayed for selection. As illustrated, the displayed pictures include a circle picture 320, a triangle picture 322, and an option for the user to upload their own picture 324. If a selection of the option for the user to upload their own picture 324 is selected, the user may specify a picture other than the displayed circle picture 320 or triangle picture 322 for use in a picture password interface. The selected picture will correspond to the displayed picture password interface for the web service specified in web service identifier 318. By allowing the user to select a custom picture, web service picture password system 112 enables a user to create a personalized picture password interface for a web service.

Figure 4:
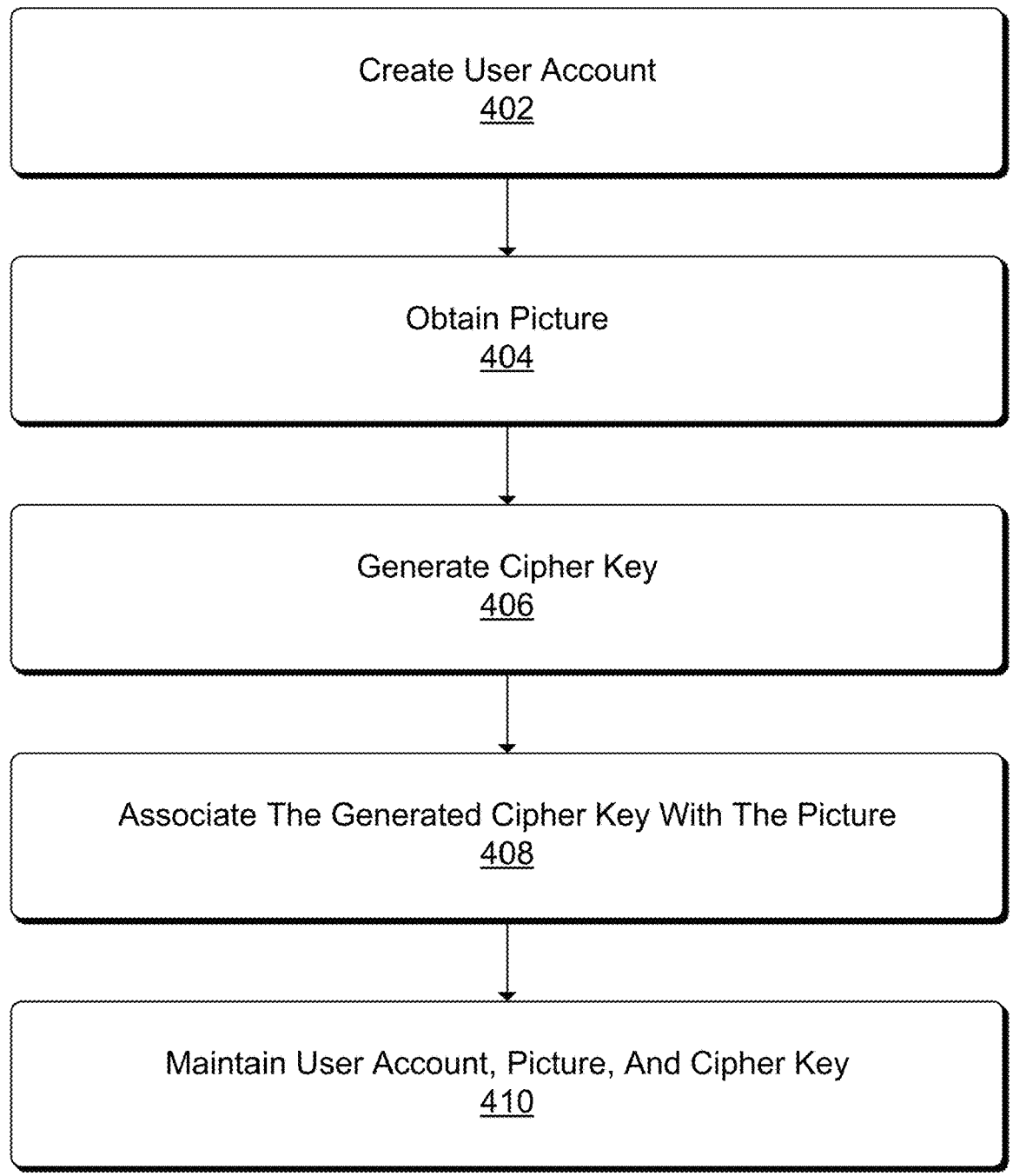
FIG. 4 is a flowchart illustrating an example process for obtaining and maintaining data relating to a picture password in accordance with one or more embodiments.

FIG. 4 is a flowchart illustrating an example process 400 for obtaining and maintaining data relating to a user's picture password in accordance with one or more embodiments.

Process 400 can be implemented in software, firmware, hardware, or combinations thereof. For example, process 400 can be implemented by the web service picture password system 112 illustrated in FIG. 1. Process 400 is shown as a set of acts and is not limited to the order shown for performing the operations of various acts. Process 400 is an example process for obtaining and maintaining data relating to a picture password; additional discussions of obtaining and maintaining data relating to a picture password are included herein with reference to different figures.

In process 400, a user account is created (act 402). The user account may be created based on a received user identifier. For example, a user account may be created based on the user identifier received via username prompt 308 of FIG. 3.

A picture is also obtained (act 404). The picture may be obtained, for example, via selection of one of the picture 320, picture 322, or picture 324 displayed in picture password creation interface 316 of FIG. 3. As illustrated in FIG. 3, the obtained picture may be a stock picture supplied by a web service picture password system 112 or it may be a custom picture provided by a user associated with the user account. The obtained picture will be displayed as the picture for the picture password interface when the user attempts to access the web service (e.g., specified in web service identifier 318 of FIG. 3.)

A cipher key is also generated (act 406) for the obtained picture. As discussed herein, a cipher key is a matrix including cells (m×n). Each matrix cell in the cipher key contains a string of characters of a certain length. The string can be generated in various manners, such as randomly, pseudo-randomly, according to other rules or criteria, and so forth. The length of a string of characters in one matrix cell can be different than (or the same as) the length of a string of characters in a different matrix cell of the cipher key. These character strings are used to make the generated cipher key specific to the user.

The generated cipher key is also associated with a picture (act 408). For example, the generated cipher key is associated with the picture obtained in act 404.

The generated cipher key, user account information, and picture are maintained (act 410). The generated cipher key, user account, and picture may be maintained by web service picture password system 112 on computing device 102. Alternatively, the generated cipher key, user account, and picture may be maintained elsewhere, such as by a key service 104 that is remote from computing device 102 as illustrated in FIG. 1. As illustrated in FIG. 1, the key service 104 is configured to store cipher keys 118. In this example, cipher keys 118 include the generated cipher key. The generated cipher key is associated with a user account, based on information such as a user identifier, and the obtained picture.

Figure 5:
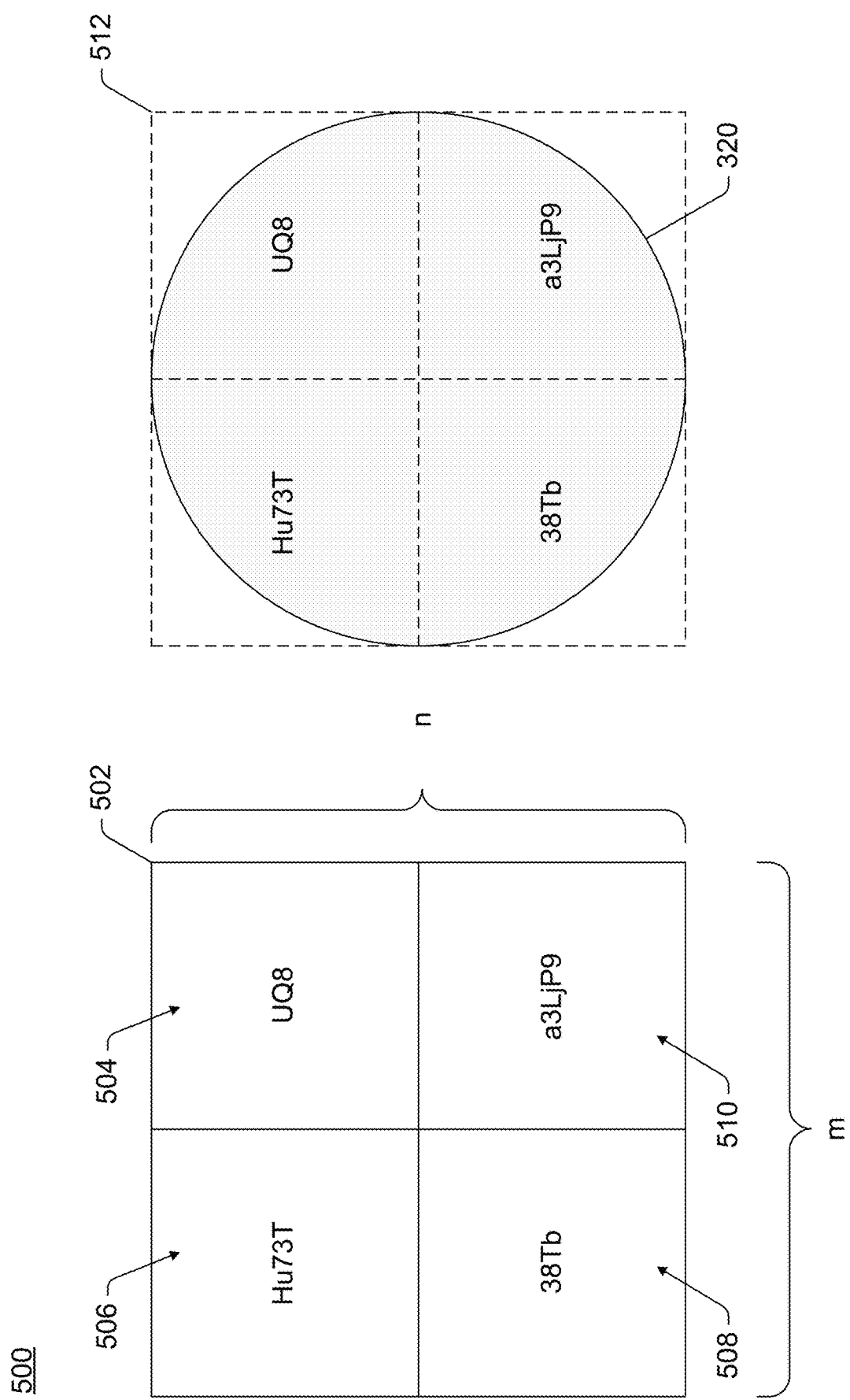
FIG. 5 illustrates an example of a cipher key in accordance with one or more embodiments.

FIG. 5 illustrates an example 500 of a cipher key 502 in accordance with one or more embodiments. The cipher key 502 is configured as an m×n matrix that includes cells 504, 506, 508, and 510. Each cell 504, 506, 508, and 510 includes a string of characters of certain length. As illustrated, the number of characters in individual cells of the cipher key may vary. For example, cell 504 includes three characters "UQ8", while cell 510 includes six characters "a3LjP9". In some situations, one or more of the cells of the cipher key 502 have no characters.

Although cipher key 502 is illustrated as an m×n matrix including four cells, a cipher key may be configured to include any number of cells. In the illustrated example, cipher key 502 is a square matrix, with m equal to n. However, the cipher key does not need to be configured as a square matrix and may be configured as a rectangular matrix including any number of m cells and any number of n cells. In one or more embodiments, the number of m cells may differ from the number of n cells.

The number of cells in the cipher key correlates to a level of security provided by the cipher key. For example, a cipher key including four cells may provide less security than a cipher key including 100 cells. The number of cells to be included in a cipher key may be designated by a user. For example, a user may be presented with an option to select a low security, a medium security, or a high security cipher key. In this example, a low security cipher key may include four cells, a medium security cipher key may include 16 cells, and a high security cipher key may include 100 cells. It should be noted that these examples are not intended to limit, and should not be construed as limiting, the number of cells to be included in a cipher key.

The cipher key 502 is associated with a picture that is to be displayed in a picture password interface. For example, the cipher key 502 may be associated with the circle picture 320 in response to receiving selection of the circle picture 320 in FIG. 3. By associating the cipher key with a picture, discrete regions of the picture may be associated with matrix cell values of the cipher key. As illustrated at 512, the cipher key 502 is associated with the picture 320. In this example, because the cipher key 502 is configured as a square matrix comprising four cells, associating the cipher key 502 with circle picture 320 results in cells 504, 506, 508, and 510 being associated with discrete quadrants of circle picture 320. These discrete quadrants are indicated by the dashed lines at 512.

By associating circle picture 320 with cipher key 502, user input received at a region in the circle picture 320 will correspond to the underlying string of characters in cipher key 502. In this manner, user input can be used to generate a user-specific and web service-specific password through user input at a picture password that includes a picture and an associated cipher key.

Figure 6:
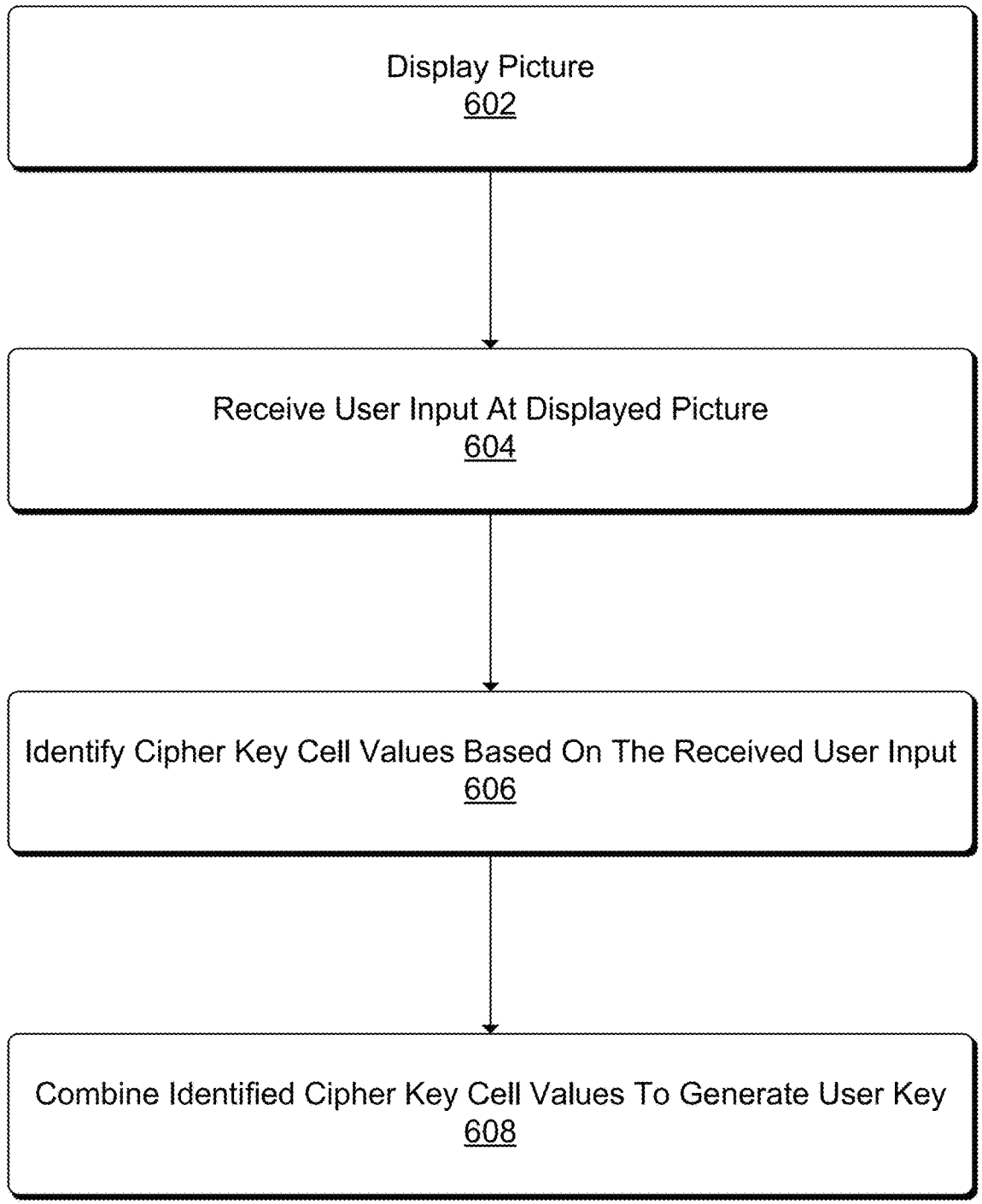
FIG. 6 is a flowchart illustrating an example process for generating a user key from a picture password interface in accordance with one or more embodiments.

FIG. 6 is a flowchart illustrating an example process 600 for generating a user key from a picture password interface in accordance with one or more embodiments. Process 600 can be implemented in software, firmware, hardware, or combinations thereof. For example, process 600 may be implemented by the web service picture password system 112 illustrated in FIG. 1. Process 600 is shown as a set of acts and is not limited to the order shown for performing the operations of various acts. Process 600 is an example process for generating a user key from a picture password interface; additional discussions of generating a user key from a picture password interface are included herein with reference to different figures.

In process 600, a picture of a picture password interface is displayed (act 602). The picture can be displayed in any of the variety of manners described herein. For example, the picture can be displayed by display module 114 illustrated in FIG. 1.

User input is received at the displayed picture (act 604). The user input can be received at any one or more regions of the displayed picture password interface and can be received in any of the variety of manners described above. For example, user input can be received via user input module 116 illustrated in FIG. 1. This user input is user selection of at least one region of the displayed picture, such as by touching one or more regions with the user's finger or a stylus, clicking on one or more regions with a mouse, performing a gesture (e.g., a swipe gesture with the region where the swipe begins and/or ends being the region(s) selected by the user input), and so forth.

Cipher key cell values are identified based on the received user input (act 606). The identification in act 606 sequentially tracks user input at the picture, recording or tracking the order in which different regions are selected (and/or if a region is selected multiple times concurrently). As user input is received, the system implementing process 600 identifies cipher key cell values corresponding to regions of the received user input on the picture password interface.

The identified cipher key cell values are combined to generate a user key (act 608). The combination in act 608 reflects the sequential progression of region selections as the user input is received at the picture. For example, cipher key cell values are combined in an order that corresponds to a progression of the user input as it is received at the picture password interface. The user key can be used in combination with a web service key and any one or more password rules to output a user-specific and web service-specific password.

Figure 7:
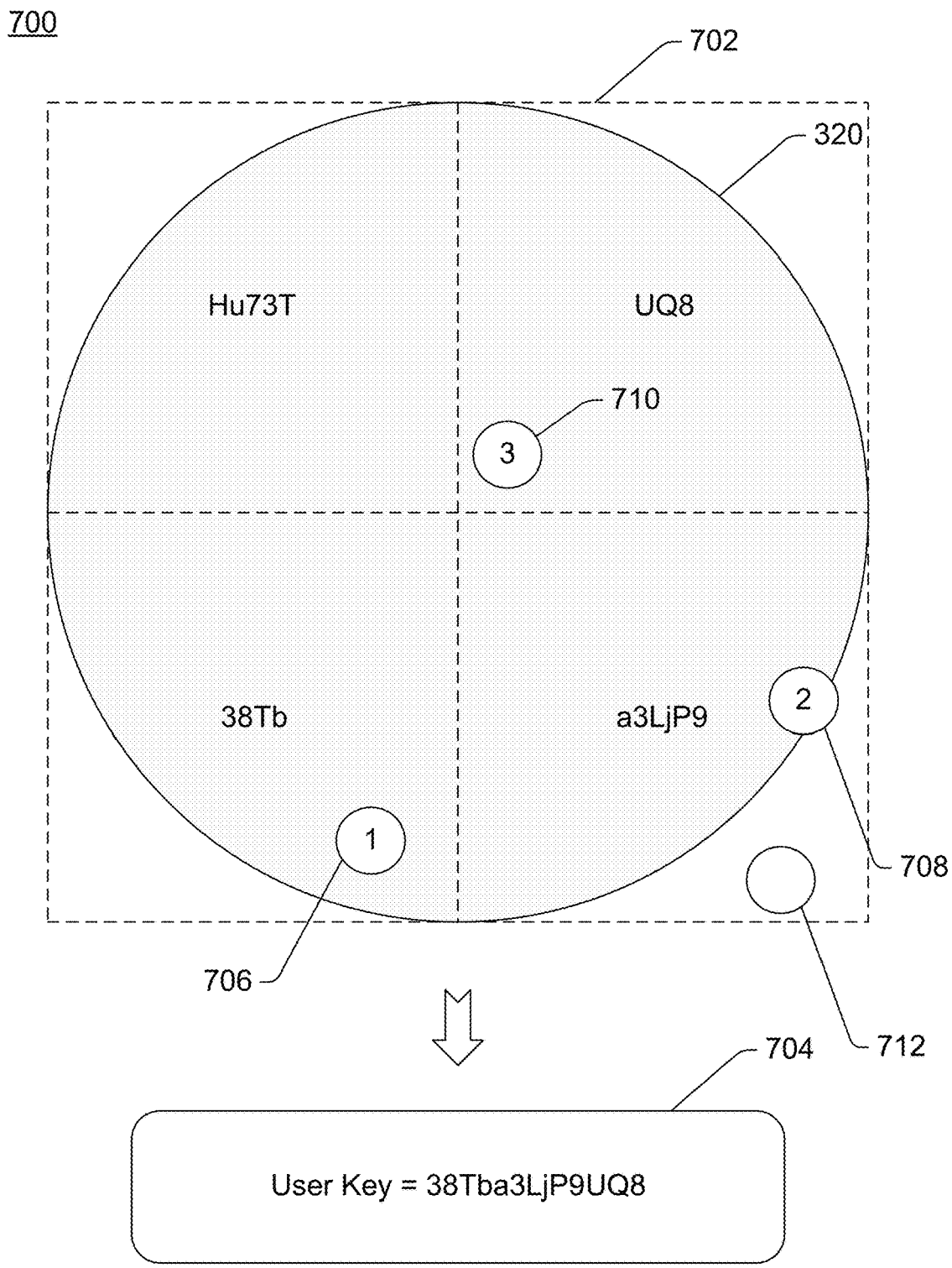
FIG. 7 illustrates an example of generating a user key from a picture password interface in accordance with one or more embodiments.

FIG. 7 illustrates an example 700 of generating a user key from a picture password interface in accordance with one or more embodiments. In example 700, a picture for a web service is displayed at 702. The displayed picture corresponds to a picture that was selected by the user for a specific web service. For example, the picture 702 includes circle picture 320 that was selected by the user via the user interface 318 illustrated in FIG. 3.

The displayed picture of the picture password interface is associated with a cipher key, such as cipher key 502 illustrated in FIG. 5. Returning to FIG. 7, as illustrated at 700, circle picture 320 is associated with the cipher key 502. As such, discrete regions of the circle 320 are correlated with cipher key cell values. In the illustrated example, these cipher key cell values are "UQ8", "Hu73T", "38Tb", and "a3LjP9". The cipher key cell values correspond to regions of the displayed circle picture 320. In the illustrated example, these regions are bounded by the dashed lines. It should be noted that neither the cipher key cell values nor the dashed lines need be displayed or otherwise made known to the user. Rather, the user viewing the picture 702 is typically only able to view the circle picture 320 displayed independent of any dashed lines or cipher key cell values.

A user key 704 is generated from user input received at the picture 702. The user key 704 includes a string of values corresponding to cell values in the associated cipher key. When user input is received at the picture 702, associated cipher key cell values are identified. As illustrated in example 700, user input is received at three discrete locations. The three discrete locations of received user input are indicated at user inputs 706, 708, and 710. The numerals one, two, and three indicated in user inputs 706, 708, and 710 identifies a sequential progression in which the user input was received.

The user key 704 is generated by identifying cipher key cell values corresponding to the received user input and combining these identified cipher key cell values into a user key. For example, as illustrated at 700, user input 706 is first received. As indicated by the dashed lines, user input 706 is received at a region of circle picture 320 that corresponds to the cipher key cell value "38Tb". Accordingly, the cipher key cell value "38Tb" is used as an initial value in the string of values for the user key 704.

As illustrated in example 700, user input 708 is received after receiving user input 706. As indicated by the dashed lines, user input 708 is received at a region of circle picture 320 that corresponds to the cipher key cell value "a3LjP9". Accordingly, the cipher key cell value "a3LjP9" is combined into the user key 704 following the cipher key cell value corresponding to the initial user input 706.

It should be noted the user input may be received in a region of picture 702 that only partially intersects or does not intersect with the displayed picture. For example, user input 712 may be received at a region within picture 702 that does not intersect or otherwise correspond to a region occupied by circle picture 320. In this example, as indicated by the dashed lines, user input 712 is received at a region of the picture 702 that does not correspond to a region of circle picture 320. In one or more embodiments, user input 712 does not alter the user key 704 because user input 712 does not correspond to (e.g., is not over or touching) a region of circle picture 320. Alternatively, because user input 712 is received at a region that corresponds to the cipher key cell value "a3LjP9", the web service picture password system 112 can treat user input 712 in a same manner as it would treat user input 708.

Finally, as illustrated in example 700, user input 710 is received. As indicated by the dashed lines, user input 710 is received at a region of the circle picture 320 that corresponds to the cipher key cell value "UQ8". Accordingly, the cipher key cell value "UQ8" is combined into the user key 704 following the cipher key cell value corresponding to the previous user input 708.

Alternatively, or in addition to receiving user input at discrete locations, user input may be received as a single user input that corresponds to multiple cipher key cells. A single user input that corresponds to multiple cipher key cells may be a swipe, a click and drag of a mouse, and so forth. For example, a swipe may begin at a region of picture 320 corresponding to user input 706 and progress in a straight line to end at a region of picture 320 corresponding to user input 708. In this example, the cipher key cell values corresponding to regions of the picture 320 intersected by the swipe are combined into a user key in an order that reflects a progression of the swipe. Accordingly, a swipe from user input 706 to user input 708 would result in cipher key cell values "38Tb" and "a3LjP9" being combined sequentially into user key 704.

Thus, user key 704 is generated by combining cipher key cell values that are identified based on received user input at the picture 702. Because the user key 704 is generated dependent on an order in which user input is received, unauthorized access to a picture and associated cipher key does not compromise the security of a picture password. Rather, a correct user key can only be generated from a picture password interface if user input is received at correct regions of the picture and if the user input is received in the correct order. If user input is received at an incorrect region of the picture or received in an incorrect order, the generated user key will not be the same as the correct user key and will ultimately produce an incorrect password. The manner in which a user-specific and web service-specific password is generated from the user key is discussed in further detail below.

Figure 8:
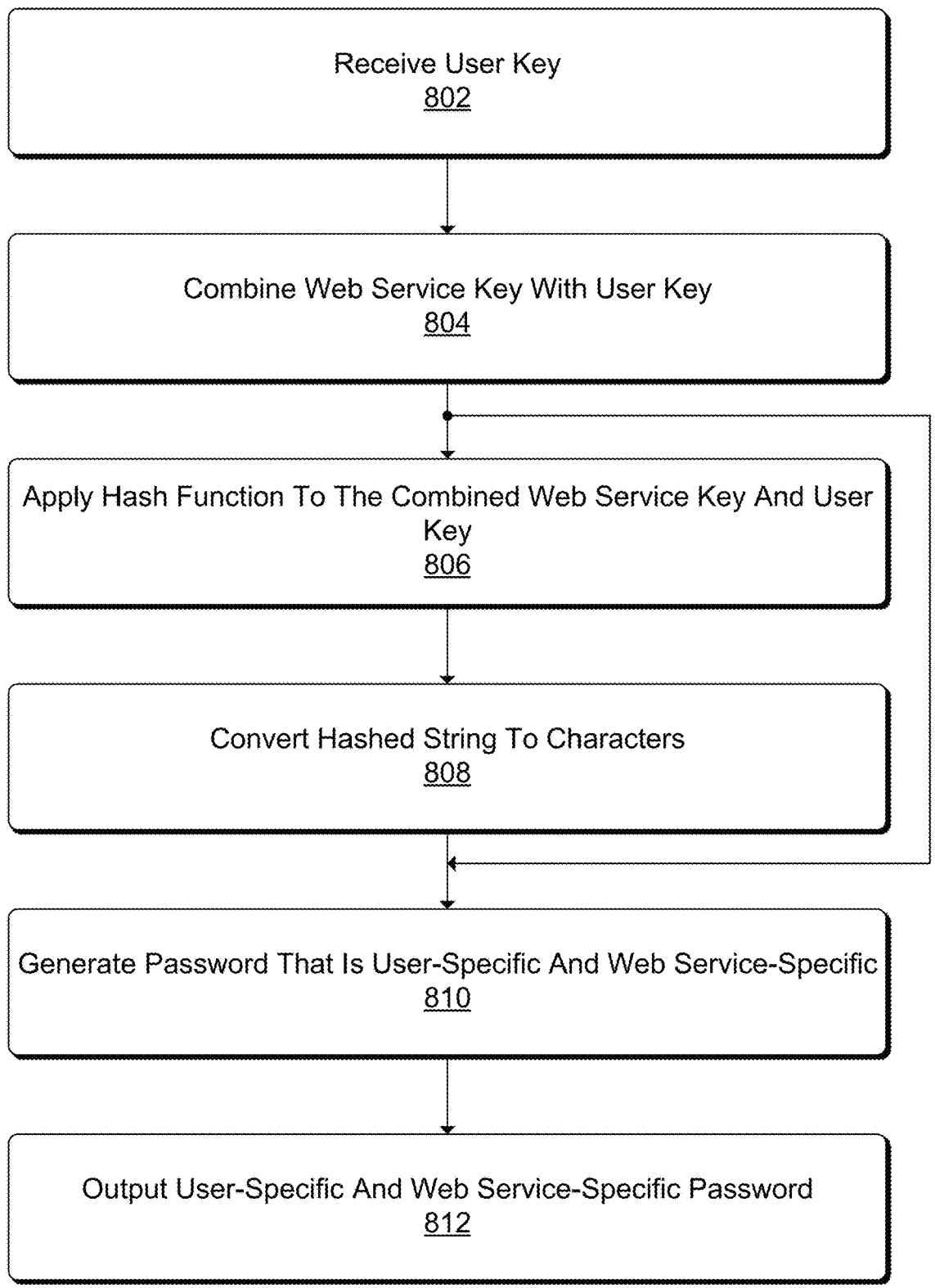
FIG. 8 is a flowchart illustrating an example process for generating a user-specific and web service-specific password in accordance with one or more embodiments.

FIG. 8 is a flowchart illustrating an example process 800 for outputting a user-specific and web service-specific password in accordance with one or more embodiments. Process 800 can be implemented in software, firmware, hardware, or combinations thereof. For example, process 800 may be implemented by the web service picture password system 112 illustrated in FIG. 1. Process 800 is shown as a set of acts and is not limited to the order shown for performing the operations of various acts. Process 800 is an example process for outputting a user-specific and web service-specific password; additional discussions of outputting a user-specific and web service-specific password are included herein with reference to different figures.

In process 800, a user key is received (act 802). The user key can be received in any of the variety of manners described above.

After the user key is received, the user key is combined with a web service key (act 804). The web service key can be created by and received from any of a variety of sources, such as from key service 104 illustrated in FIG. 1. If no web service key exists for a web service, a web service key can be created by a system generating the password, such as the web service picture password system 112 illustrated in FIG. 1. Alternatively, the web service key may be received directly from a web service, such as one of the web services 124 illustrated in FIG. 1.

As discussed herein, a web service key is defined as a string of characters that are specific to a web service. For example, as illustrated in the web service identifier 318 of FIG. 3, a web service key for the specified web service "xyz.com" may be a string of characters "XYZCOM". In this example, the web service key "XYZCOM" cannot be assigned to any web service besides "xyz.com". Thus, the web service key identifies an associated web service.

A web service key may be specified by a web service or may be assigned to a web service. For example, web service "xyz.com" may specify that its web service key is "XYZ-COM". Alternatively, if web service "xyz.com" does not specify its own web service key, web service picture password system 112 may assign a web service key to "xyz.com".

After a web service key has been assigned to a web service, the assigned web service key is stored for future reference. For example, web service keys may be stored and maintained by a key service 104, as illustrated in FIG. 1. Alternatively, web service keys may be stored and maintained by computing device 102, as illustrated in FIG. 1. Alternatively or additionally, a web service key may be stored and maintained by a web service with which it is associated. For example, each of the web services 124 may store and maintain their own web service key.

After the web service key is combined with the user key, the system implementing process 800 may generate a password that is user-specific and web service-specific (act 810). The user-specific and web service-specific password may be generated in a variety of manners.

Optionally, the system implementing process 800 may apply security precautions to the combined web service key and user key prior to generating the user-specific and web service-specific password. For example, the system implementing process 800 may apply a hash function (act 806) to the combined web service key and user key. The optional hash function may be any cryptographic hash function, such as MD5 (Message-Digest 5). Applying the hash function to the combined web service key and user key produces a hashed string.

If the system implementing process 800 optionally applies the hash function to the combined web service key and user key, the hashed string is then converted to characters (act 808). The hashed string may be converted to characters using a variety of approaches. For example, the hashed string may be converted to ASCII characters using a lookup table. In this example, each byte of the hashed string after the first eight bits is converted to ASCII characters. The converted ASCII characters are then used as the generated password that is user-specific and web service-specific (act 810).

After generation, the user-specific and web service-specific password is output (act 812). The output user-specific and web service-specific password can be used to authenticate a user and provide the user access to the web service. The user-specific and web service-specific password can be output in a variety of different manners. In one or more embodiments, the user-specific and web service-specific password is communicated to the web service to allow the web service to control access to the web service based on the generated user-specific and web service-specific password.

For example, the user-specific and web service-specific password may be output to password prompt 310, as illustrated in FIG. 3. Thus, in accordance with one or more embodiments discussed herein, user input to a picture password interface may be translated into a text password that is specific to a user and specific to a web service that the user is attempting to access.

In the illustrated example 300 of FIG. 3, after the user-specific and web service-specific password is output to password prompt 310, web service picture password system 112 receives a selection of picture prompt 316. The picture of the picture password interface, such as picture 702 illustrated in FIG. 7, is then displayed once more to receive user input. A user-specific and web service-specific password is then generated based on received user input, as described above. The generated user-specific and web service-specific password is then output to verify password prompt 312, as illustrated in FIG. 3. If a correct sequence of user input was received at the displayed picture password interface, the user-specific and web service-specific passwords output to password prompts 310 and 312 enable a web service to authenticate, and provide access to, the user.

Figure 9:
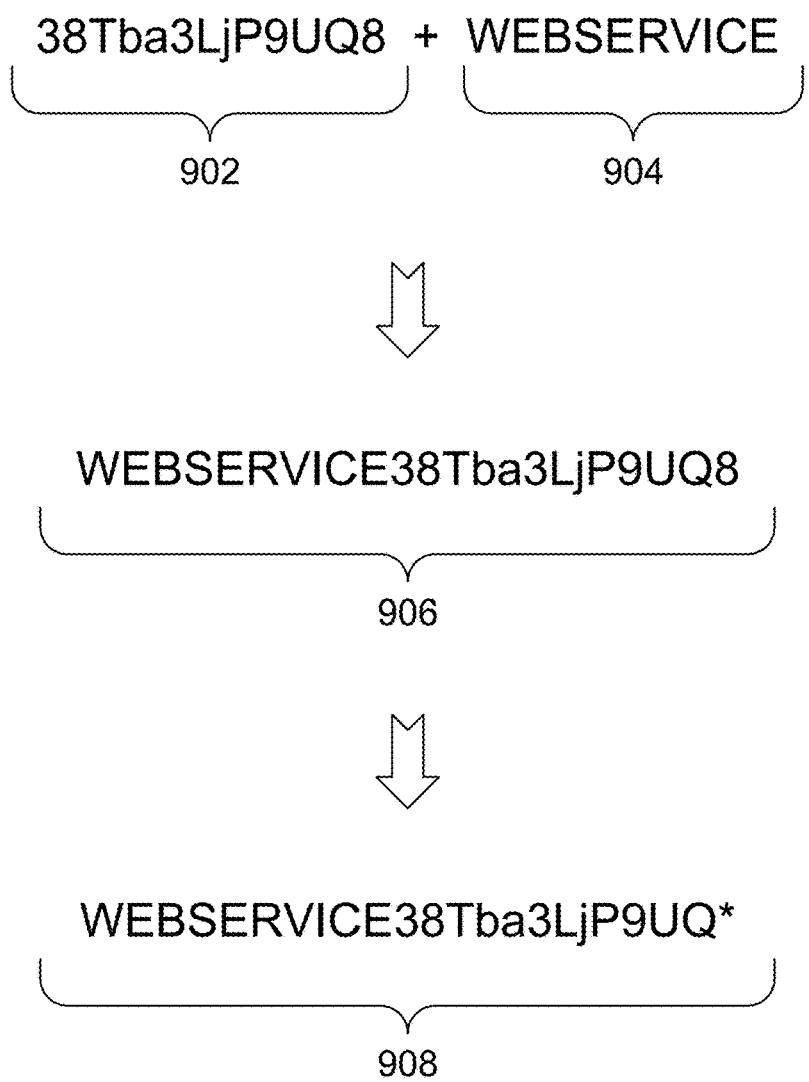
FIG. 9 illustrates an example of generating a user-specific and web service-specific password in accordance with one or more embodiments.

FIG. 9 illustrates an example 900 of a user-specific and web service-specific password output in accordance with one or more embodiments. At example 900, a user-specific and web service-specific password is created by combining a user key 902 with a web service key 904. In the example 900, user key 902 corresponds to user key 704, as illustrated in FIG. 7. Web service key 904 identifies a web service for which the password is generated.

The user key 902 and the web service key 904 are combined to generate a user-specific and web service-specific password 906. The user key 902 and the web service key 904 can be combined in any of a variety of different manners to generate the user-specific and web service-specific password 906. In example 900, the web service key 904 is illustrated as preceding the user key 902 in the user-specific and web service-specific password 906. Alternatively, the user-specific and web service-specific password 906 may be generated by combining the user key 902 as preceding the web service key 904. The order in which a user key and a web service key are to be combined to generate a user-specific and web service-specific password may be specified by a web service. Additionally or alternatively, an order in which the user key in the web service key are to be combined may be specified by a system generating the password, such as the web service picture password system 112, illustrated in FIG. 1.

Alternatively, the user key 902 and the web service key 904 can be combined in other manners to generate the user-specific and web service-specific password 906. For example, alternating characters from the user key 902 and the web service key 904 can be selected (e.g., resulting in a user-specific and web service-specific password 906 of "3W8ETBbSaE3RLVjIPC9EUQ8").

In order to ensure that the generated user-specific and web service-specific password complies with any password rules for a web service, the generated password can be verified against these password rules. For example, consider a web service with password rules that require a password to include a minimum of eight characters, include at least one lowercase character, include at least one uppercase character, include at least one number, and include at least one special symbol. In this example, the user-specific and web service-specific password 906 would not comply with the password complexity rules for the web service.

In order to change the generated password so that it complies with any web service password rules, the generated password can be verified. This verification can be performed by a system generating the password, such as the web service picture password system 112, illustrated in FIG. 1. If the system determines that the generated password does not comply with the web service's password rules, the system can process the generated password until it complies with the password rules.

Password rules for the web service may be retrieved from password rules 122 maintained at key service 104, as illustrated in FIG. 1. Additionally or alternatively, the system may ascertain password rules directly from the web service. For example, the system may receive password rules directly from a web service, and such as any of the web services 126, 128, or 130, as illustrated in FIG. 1. Alternatively, the system may ascertain password rules that are displayed at a user interface of the web service. For example, the system may perform text recognition on the web service's user interface to ascertain any displayed password rules.

After the system has received any password rules for the web service, the generated password is compared against these password rules to verify that the generated password is in compliance. In the event that the generated password is not in compliance with the password rules, the system can change individual characters of the generated password until the generated password is in compliance with the password rules. Individual characters of a generated password may be changed using any suitable deterministic algorithm or process.

Returning to FIG. 9, password 908 is an example of the user-specific and web service-specific password 906 that has been updated to comply with a web service's password rules. In the illustrated example, password 908 has been updated to comply with password rules that require a password to include a minimum of eight characters, include at least one lowercase character, include at least one uppercase character, include at least one number, and include at least one special symbol.

In this example, user-specific and web service-specific password 906 fails to comply with the password rules because it does not include at least one special symbol. The system that generated password 906 can identify the password's non-compliance with the password rules by scanning individual characters of the password 906 and comparing these characters against the password rules. The system can then the change individual characters of the generated password 906 as needed to update password 906 until it is in compliance with the password rules.

In the illustrated example 900, the final character of user-specific and web service-specific password 906 has been updated from the number 8 to an asterisk. As such, user-specific and web service-specific password 908 complies with the web service's example password rules listed above. It should be noted that although only a single character of the password 906 was updated to generate password 908, the system may update as many characters in a generated password as needed in order to comply with a web service's password rules.

Which characters of the user-specific and web service-specific password are changed so that the user-specific and web service-specific password complies with the web service's password rules can be determined in any of a variety of different manners. For example, the last character(s) of the user-specific and web service-specific password can be changed, or the first character(s) of the user-specific and web service-specific password can be changed, the character(s) of the user-specific and web service-specific password can be selected randomly or pseudo-randomly, and so forth. Various other rules or criteria can also be used. For example, an index into the user-specific and web service-specific password can be determined by determining the ASCII value of a character (e.g., the last character in the user-specific and web service-specific password) modulo the number of characters in the user-specific and web service-specific password minus 1.

In the discussions herein, various different embodiments are described. It is to be appreciated and understood that each embodiment described herein can be used on its own or in connection with one or more other embodiments described herein. For example, a web service picture password system may implement any one or combination of the process 200 of FIG. 2, the process 400 of FIG. 4, the process 600 of FIG. 6, and the process 800 of FIG. 8.

Figure 10:
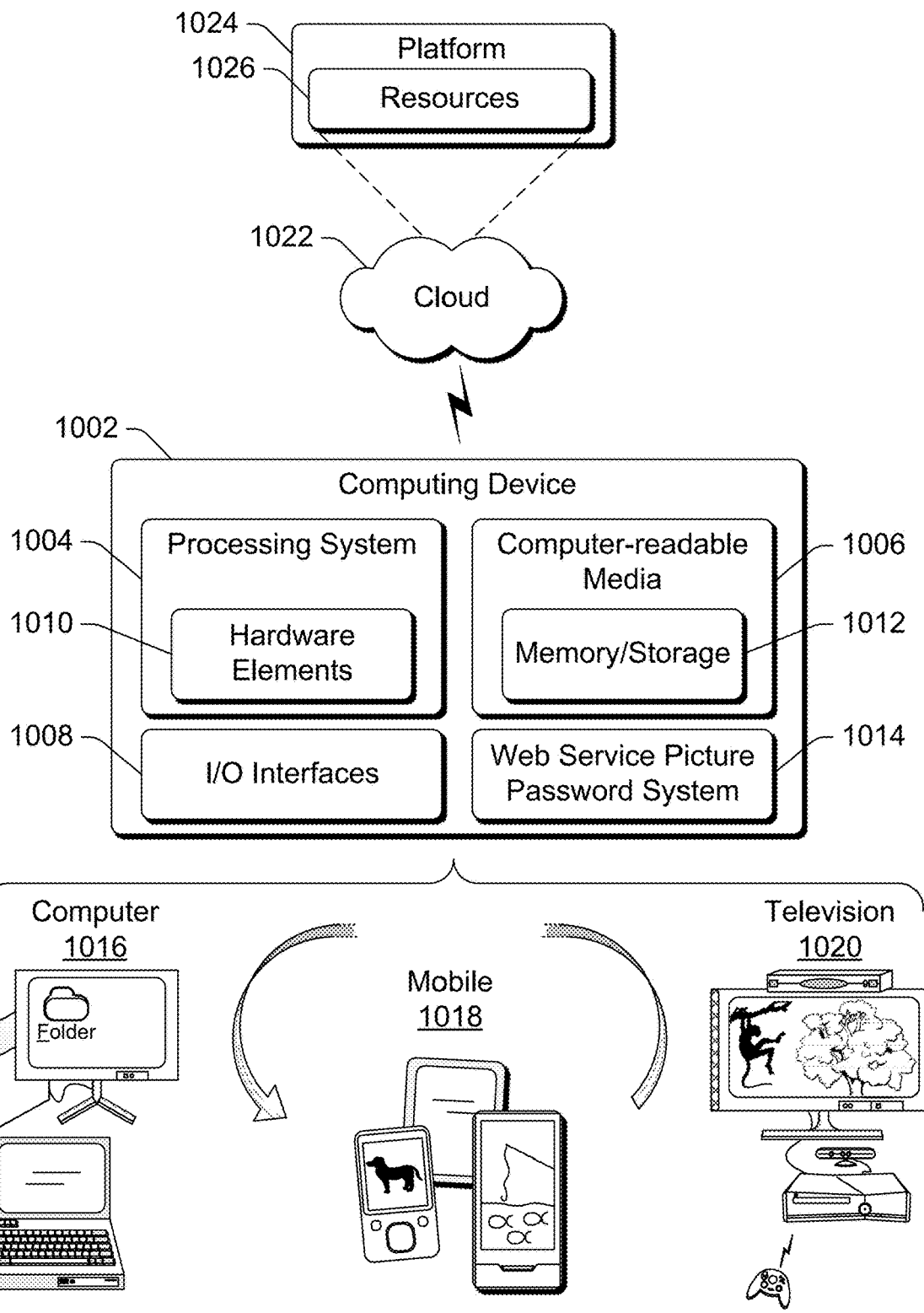
FIG. 10 illustrates an example system that includes an example computing device that is representative of one or more systems and/or devices that may implement the various techniques described herein.

FIG. 10 illustrates an example system generally at 1000 that includes an example computing device 1002 that is representative of one or more systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

The one or more input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

The computing device 1002 also includes a web service picture password system 1014. The web service picture password system 1014 provides various picture password functionality as discussed above. The web service picture password system 1014 can implement, for example, the operating environment 100 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1016, mobile 1018, and television 1020 uses. Each of these configurations includes devices that may have generally different constructs and capabilities, and thus the computing device 1002 may be configured according to one or more of the different device classes. For instance, the computing device 1002 may be implemented as the computer 1016 class of a device that includes a personal computer, desktop computer, a multi-screen computer, laptop computer, netbook, and so on.

The computing device 1002 may also be implemented as the mobile 1018 class of device that includes mobile devices, such as a mobile phone, portable music player, portable gaming device, a tablet computer, a wearable computing device, a multi-screen computer, and so on. The computing device 1002 may also be implemented as the television 1020 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This functionality may also be implemented all or in part through use of a distributed system, such as over a "cloud" 1022 via a platform 1024 as described below.

The cloud 1022 includes and/or is representative of a platform 1024 for resources 1026. The platform 1024 abstracts underlying functionality of hardware (e.g., servers) and software resources of the cloud 1022. The resources 1026 may include applications and/or data that can be utilized while computer processing is executed on servers that are remote from the computing device 1002. Resources 1026 can also include services provided over the Internet and/or through a subscriber network, such as a cellular or Wi-Fi network.

The platform 1024 may abstract resources and functions to connect the computing device 1002 with other computing devices. The platform 1024 may also serve to abstract scaling of resources to provide a corresponding level of scale to encountered demand for the resources 1026 that are implemented via the platform 1024. Accordingly, in an interconnected device embodiment, implementation of functionality described herein may be distributed throughout the system 1000. For example, the functionality may be implemented in part on the computing device 1002 as well as via the platform 1024 that abstracts the functionality of the cloud 1022.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: displaying a picture as part of a picture password interface; receiving user input selecting at least one of multiple different regions of the displayed picture, each of the multiple regions corresponding to a different one of multiple cells of a cipher key corresponding to the displayed picture, each of the multiple cells corresponding to a string of one or more characters; generating a user key by combining the strings of one or more characters of the cells corresponding to the selected at least one region; generating a password for a web service by combining the user key with a web service key for the web service; and communicating the generated password to the web service.

Alternatively or in addition to any of the above described methods, any one or a combination of: wherein the web service supports text passwords but does not provide native support for picture passwords; the method further comprising generating the web service key for the web service in response to determining that no web service key exists for the web service; the method further comprising identifying a user account based on a received user identifier and obtaining the picture based on the received user identifier, wherein the picture of the picture password comprises a picture that is received by user upload of the picture; wherein a first cell of the cipher key includes a string comprising a first amount of characters and a second cell of the cipher key includes a string comprising a second amount of characters that is different from the first amount of characters; wherein generating the user key comprises applying a hash function to a combination of the strings of one or more characters of the cells corresponding to the selected at least one region to produce a hashed string and converting the hashed string to characters; wherein generating the user key comprises identifying cipher key cell values corresponding to selected multiple different regions of the displayed picture and combining the identified cipher key cell values based on an order in which the multiple different regions were selected; wherein the web service is associated with at least one password rule, the at least one password rule specifying one or more of a minimum number of characters to be used in the generated password, a minimum amount of lowercase characters to be used in the generated password, a minimum amount of uppercase characters to be used in the generated password, a minimum amount of number characters to be used in the generated password, or a minimum number of special characters to be used in the generated password; the method further comprising verifying that the generated password complies with one or more password rules associated with the web service prior to communicating the generated password to the web service; the method further comprising determining that the generated password does not comply with one or more password rules associated with the web service and changing one or more characters of the generated password until the generated password complies with the one or more password rules associated with the web service; the method further comprising outputting the generated password to a user interface for the web service in response to verifying that the generated password complies with one or more password rules associated with the web service.

A method, comprising: creating a user account corresponding to a user identifier; obtaining a picture associated with the user account; generating a cipher key for the obtained picture, the cipher key comprising multiple cells, individual ones of the multiple cells including a string of characters; associating the generated cipher key with the obtained picture by correlating different regions of the obtained picture with different cells of the multiple cells; and maintaining the obtained picture and associated cipher key as picture password data for the user account.

Alternatively or in addition to the any of the above described methods, any one or combination of: wherein individual ones of the multiple cells of the cipher key include a pseudo-random string of characters, and wherein one of the multiple cells includes a pseudo-random string of characters having a different length than a pseudo-random string of characters of a different one of the multiple cells; wherein the picture password data for the user account is associated with a web service, the web service comprising one of a web site, a web domain, or a web application; the method further comprising maintaining one or more password rules that describe one or more password complexity rules for one or more web services; wherein a number of the multiple cells of the cipher key is specified by a level of security associated with the generated cipher key, the level of security being selectable by a user of the user account; the method further comprising receiving a request for a picture password interface that specifies the user identifier and a web service and providing the obtained picture and associated cipher key as the picture password interface in response to receiving the request.

A device comprising: one or more processors; and a memory storing executable instructions that are executable by the one or more processors to perform operations including: displaying a picture that is part of a picture password interface; receiving user input at the displayed picture; identifying, based on the received user input, cell values of a cipher key that includes multiple cells and that is associated with the picture, individual ones of the cipher key cells comprising a string of characters; generating a user key by combining the identified cell values based on an order in which the user input at the displayed picture is received; generating a user-specific and web service-specific password by combining the generated user key with a web service key for a web service; and outputting the generated user-specific and web service-specific password to a login interface for the web service.

Alternatively or in addition to any of the above described devices, any one or combination of: wherein identifying cell values of the cipher key comprises identifying one or more regions of the displayed picture at which the user input was received and correlating the one or more regions of the displayed picture with one or more cells of the cipher key; the operations further comprising verifying that the generated user-specific and web service-specific password complies with one or more password rules associated with the web service prior to outputting the generated password to the login interface for the web service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   displaying a single picture as part of a picture password interface;
   receiving user input selecting at least two of multiple different regions of the single picture, each of the multiple regions corresponding to a different one of multiple cells of a cipher key corresponding to the single picture, each of the multiple cells corresponding to a string of one or more characters;
   generating, based on the received user input, a user key by concatenating the strings of one or more characters of the cells corresponding to the selected at least two of the multiple different regions in an order of selection of the at least two of the multiple different regions;
   generating a text password for a web service that natively supports text passwords but does not natively support picture passwords by combining the user key with a web service key for the web service; and
   communicating the generated password to the web service.

2. The method as recited in claim 1, wherein the displaying the single picture as part of the picture password interface comprises:
   displaying a traditional login interface for the web service, the traditional login interface comprising fields designated to receive user credentials in a textual format; and
   in response to receiving a selection of a picture prompt on the traditional login interface, transitioning from displaying the traditional login interface to displaying the picture password interface.

3. The method as recited in claim 1, further comprising generating the web service key for the web service in response to determining that no web service key exists for the web service.

4. The method as recited in claim 1, further comprising identifying a user account based on a received user identifier and obtaining the picture based on the received user identifier, wherein the picture of the picture password comprises a picture that is received by user upload of the picture.

5. The method as recited in claim 1, wherein a first cell of the cipher key includes a string comprising a first amount of characters and a second cell of the cipher key includes a string comprising a second amount of characters that is different from the first amount of characters.

6. The method as recited in claim 1, further comprising applying a hash function to the combined user key and web service key to produce a hashed string and converting the hashed string to characters.

7. The method as recited in claim 1, wherein generating the user key comprises identifying cipher key cell values corresponding to the selected at least two of the multiple different regions of the displayed picture and combining the identified cipher key cell values based on an order in which the at least two of the multiple different regions were selected.

8. The method as recited in claim 1, wherein the web service is associated with at least one password rule, the at least one password rule specifying one or more of a minimum number of characters to be used in the generated password, a minimum amount of lowercase characters to be used in the generated password, a minimum amount of uppercase characters to be used in the generated password, a minimum amount of number characters to be used in the generated password, or a minimum number of special characters to be used in the generated password.

9. The method as recited in claim 1, further comprising verifying that the generated password complies with one or more password rules associated with the web service prior to communicating the generated password to the web service.

10. The method as recited in claim 1, further comprising determining that the generated password does not comply with one or more password rules associated with the web service and changing one or more characters of the generated password until the generated password complies with the one or more password rules associated with the web service.

11. The method as recited in claim 1, further comprising outputting the generated password to a user interface for the web service in response to verifying that the generated password complies with one or more password rules associated with the web service.

12. A method, comprising:
creating a user account corresponding to a user identifier;
obtaining a picture associated with the user account;
generating a cipher key for the obtained picture, the cipher key comprising multiple cells, individual ones of the multiple cells including a string of characters;
associating the generated cipher key with the obtained picture by correlating different regions of the obtained picture with different cells of the multiple cells; and
maintaining the obtained picture and associated cipher key as picture password data to be used to generate a user key by concatenating strings of characters of user-selected cells in an order of selection to generate a text password for the user account, the user key being combinable with a web service key to create a text password for a web service that natively supports text passwords but does not natively support picture passwords.

13. The method as recited in claim 12, wherein individual ones of the multiple cells of the cipher key include a pseudo-random string of characters, and wherein one of the multiple cells includes a pseudo-random string of characters having a different length than a pseudo-random string of characters of a different one of the multiple cells.

14. The method as recited in claim 12, the web service comprising one of a web site, a web domain, or a web application.

15. The method as recited in claim 12, further comprising maintaining one or more password rules that describe one or more password complexity rules for one or more web services.

16. The method as recited in claim 12, wherein a number of the multiple cells of the cipher key is specified by a level of security associated with the generated cipher key, the level of security being selectable by a user of the user account.

17. The method as recited in claim 12, further comprising receiving a request for a picture password interface that specifies the user identifier and a web service and providing the obtained picture and associated cipher key as the picture password interface in response to receiving the request.

18. A device comprising:
one or more processors; and
a memory storing executable instructions that are executed by the one or more processors to perform operations including:
displaying a picture that is part of a picture password interface;
receiving user input at the displayed picture;
identifying, based on the received user input, cell values of a cipher key that is associated with the picture and includes multiple cells, individual ones of the multiple cipher key cells corresponding to a different region of the displayed picture and comprising a string of characters;
generating a user key by concatenating the identified cell values based on an order in which the user input at the displayed picture is received;
generating a user-specific and web service-specific password by combining the generated user key with a web service key for a web service that natively supports text passwords but does not natively support picture passwords; and
outputting the generated user-specific and web service-specific password to a login interface for the web service.

19. The device as recited in claim 18, wherein identifying cell values of the cipher key comprises identifying two or more regions of the displayed picture at which the user input was received and correlating the two or more regions of the displayed picture with two or more cells of the cipher key.

20. The device as recited in claim 18, the operations further comprising verifying that the generated user-specific and web service-specific password complies with one or more password rules associated with the web service prior to outputting the generated password to the login interface for the web service.

* * * * *